United States Patent [19]
Lang, Jr.

[11] Patent Number: 6,102,443
[45] Date of Patent: Aug. 15, 2000

[54] FLUID LINE LATCHING ASSEMBLY

[76] Inventor: John L. Lang, Jr., 2805 Sunburst Dr., Smithville, Mo. 64089

[21] Appl. No.: 09/167,214

[22] Filed: Oct. 6, 1998

[51] Int. Cl.⁷ .................................................... F16B 23/00
[52] U.S. Cl. .................................. 285/65; 285/66; 285/67
[58] Field of Search .................................. 285/65, 66, 67, 285/68, 69, 70, 71, 72, 73, 74, 75, 76, 77, 78, 79

[56] References Cited

U.S. PATENT DOCUMENTS

| | | |
|---|---|---|
| 2,257,321 | 9/1941 | Arnold ........................................ 285/64 |
| 3,700,269 | 10/1972 | Salata ......................................... 285/78 |
| 3,879,066 | 4/1975 | Kizinski ..................................... 285/69 |
| 3,892,431 | 7/1975 | Booth ......................................... 285/79 |
| 3,941,254 | 3/1976 | Sweger, Jr. . |
| 4,109,673 | 8/1978 | Horowitz . |
| 4,747,623 | 5/1988 | Newcomb . |
| 4,784,610 | 11/1988 | Stuart . |
| 4,852,915 | 8/1989 | Campanini . |
| 5,239,848 | 8/1993 | Nichols, Jr. . |
| 5,251,666 | 10/1993 | Kimball . |
| 5,301,985 | 4/1994 | Terzini ........................................ 285/79 |
| 5,333,915 | 8/1994 | Sparling ...................................... 285/79 |
| 5,388,864 | 2/1995 | Kozinski ..................................... 285/76 |
| 5,685,573 | 11/1997 | Nadherny . |
| 5,842,724 | 12/1998 | Kozinski ..................................... 285/65 |
| 5,865,329 | 2/1999 | Gay ............................................ 285/68 |

*Primary Examiner*—Lynne H. Browne
*Assistant Examiner*—Aaron Dunwoody
*Attorney, Agent, or Firm*—J. David Wharton; Shook, Hardy & Bacon L.L.P.

[57] ABSTRACT

A latching assembly for a first fluid line connector, such as a standard "glad hand" connector, to prevent disengagement of the first fluid line connector from a second fluid line connector with which it is interconnected. The latching assembly includes a latch member that is movable between a locking position, wherein the latch member cooperates with a travel stop of a first retainer coupled with the first fluid line connector to restrict rotational movement on the first fluid line connector, and a release position, wherein the latch member allows disengagement of the first fluid line connector from the second fluid line connector. A structure is provided for biasing the latch member to the locking position.

3 Claims, 2 Drawing Sheets

FLUID LINE LATCHING ASSEMBLY

BACKGROUND OF THE INVENTION

This invention relates to the field of fluid line connectors and, more particularly, to a latching assembly for preventing disengagement of two interconnected fluid line connectors.

Braking systems for commercial vehicles have long relied on pressurized air for operation. In such an air braking system, the brake shoes or disk pads engage and disengage their respective drum or disk in response to changes in air pressure within the braking system. The system is normally designed so that when unpressurized, the brakes engage the wheels to prevent further rotation. Air pressure must then be supplied to force the shoes or pads away from the respective drum or disk, causing the brakes to release the wheels. Such a braking system offers safety in that an undesired failure of the air pressurization system is less likely to cause a failure of the braking system.

Commercial vehicles having such air brakes are coupled with, and uncoupled from, one another on a frequent basis. To facilitate ease of use, fluid line connectors have been developed that facilitate quick interconnection of air brake lines. For example, a semi-trailer typically has air brake lines that terminate on the forward end of the trailer in a connector that is coupled to a complemental connector on the tractor. Railroad cars often have fluid line connectors for their braking systems as well. The connector is often of the style known as a "glad hand." Glad hand connectors are widely used because they facilitate quick and easy interconnection of fluid lines, such as air brake lines.

Problems arise when two interconnected fluid line connectors disengage at an undesired time. A complete disengagement between the connectors usually triggers a highly application of the braking system. If the fluid lines of multiple vehicles, such as railroad cars, are interconnected, the potential for problems from unwanted stoppages and possible equipment damage increases. Loose or improperly connected fluid line connectors may also cause brake failures under some circumstances. While the problem of undesired fluid line connector disengagement has been recognized, solutions have involved complex mechanical or lock and key arrangements.

To overcome these and other limitations of the prior art, an improved fluid line connector is desirable that is easy to operate and manufacture.

SUMMARY OF THE INVENTION

Accordingly, it is an object of the present invention to provide a latching assembly for a fluid line connector that prevents two interconnected fluid line connectors from disengaging at undesired times.

Another important object of the present invention is to provide a latch assembly that is hand operable and requires no key or tool for normal operation. A related object is to provide a latching assembly that is easy to operate and inexpensive to manufacture and assemble.

It is a further object of the present invention to provide a latching assembly for a fluid line connector that is so biased as to better ensure that the latching assembly returns to the closed position after operation to prevent disengagement.

It is yet another important object of this invention to provide a latching assembly that is mountable to a standard fluid line connector with little or no modification required to the fluid line connector.

It is also an objective of this invention to provide a latch assembly for locking two interconnected fluid line connectors which does not require additional steps by the operator to accomplish locking beyond those normally required to complete the connection.

According to the present invention, the foregoing and other objects are obtained by supplying a fluid line connector with a latching assembly whose movement is constrained between a locking position and a release position. In the preferred embodiment, the latching assembly is coupled with a first fluid line connector having a fluid port, a first flange and a first retainer. The first retainer is provided with a travel stop at one end, and the fluid port terminates in an external port surface. The first fluid line connector is adapted to be coupled with a second fluid line connector, usually by coaxial rotation, so that a second flange on the second fluid line connector is complementally received in the first retainer and a second retainer on the second fluid line connector complementally receives the first flange. A latch member is coupled with the first fluid line connector and is moveable in a plane substantially parallel to the plane containing the external port surface between the locking position and the release position. In the locking position, the latch member cooperates with the travel stop in the first retainer to restrict further rotational movement of the first fluid line connector relative to the second fluid line connector. In the release position, the latch member allows disengagement of the interconnected fluid line connectors. The latching assembly is preferably supplied with a means for biasing it to the locking position to further prevent undesired disconnections. The latching assembly may also be supplied with a means for limiting its movement, such as by providing the latching member with a slot into which a rigid member protrudes from the first fluid line connector to thereby mechanically restrict travel.

Additional objects, advantages and novel features of the invention will be set forth in part in the description which follows, and in part will become apparent to those skilled in the art upon an examination of the following, or may be learned by practice of the invention.

BRIEF DESCRIPTION OF THE DRAWINGS

In the accompanying drawings which form part of this specification and which are to be read in conjunction therewith and at which like reference numerals are used to indicate like parts in the various views.

DETAILED DESCRIPTION OF THE PREFERRED EMBODIMENTS

Figure 1:
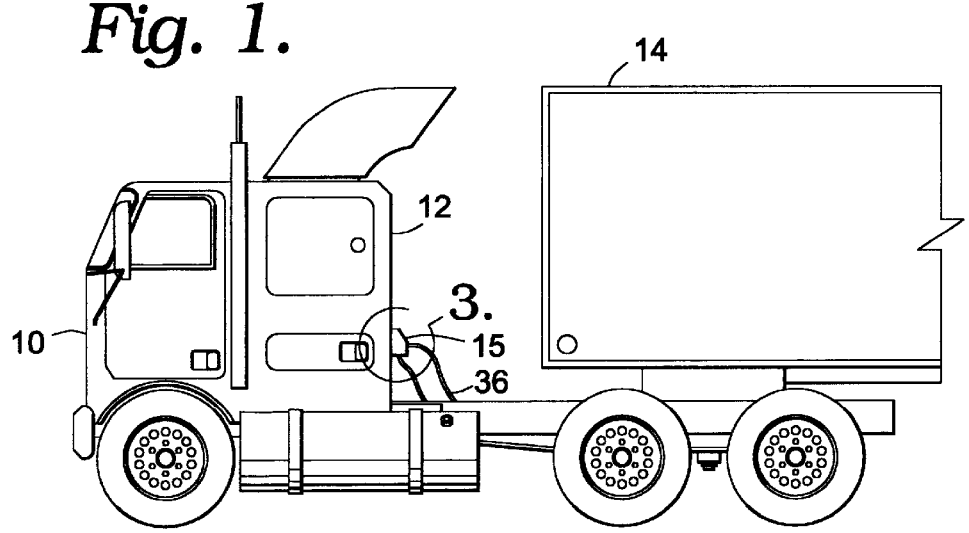
FIG. 1 is a side view of a tractor and portion of a semitrailer showing a typical location of the present invention.

Referring to the drawings in greater detail, a tractor 10 and semitrailer 14 are shown generally in FIG. 1. A fluid line connection 15 is mounted on a rear wall 12 of tractor 10. In this context, it is understood that "fluid" contemplates both liquids and gases, although for tractor 10 and semitrailer 14, the usual operative fluid is air. Moreover, the present invention is not limited to tractor semi-trailer applications and is equally useful for railroad cars and other vehicles having interconnected fluid lines.

Figure 2:
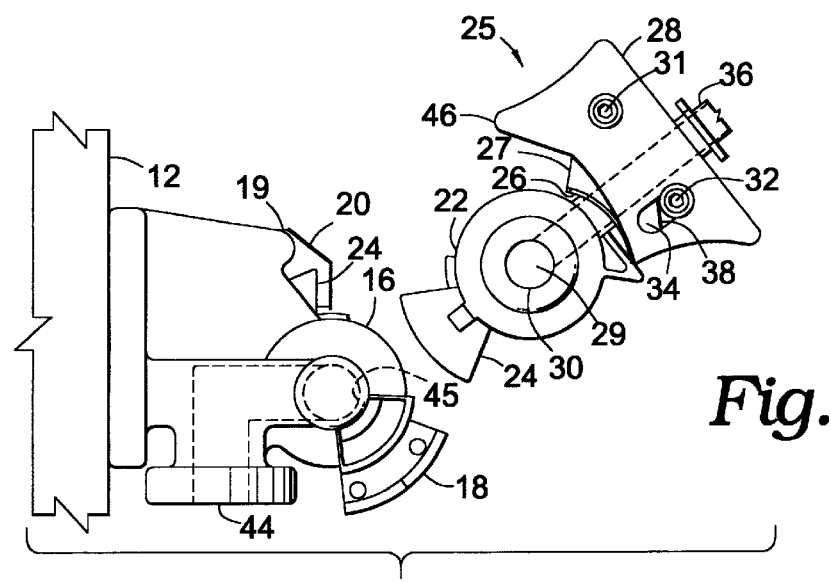
FIG. 2 is a partial side elevation showing the latching assembly of the present invention.

A latching assembly 25 embodying the principles of the present invention is shown generally in FIG. 2. Latching assembly 25 is coupled with a first fluid line connector 22 having a first flange 24, a first retainer 26 and a fluid port 29. First fluid line connector 22 is preferably of the well-known "glad hand" type, although other types of fluid connectors could be employed with the present invention. First flange 24 is disposed angularly about the circumference of first fluid line connector 22 and is preferably shaped to define an arc less than 90 degrees. First retainer 26 is supplied with a first travel stop 27. In the preferred embodiment, first retainer 24 comprises a removable plate from which travel stop 27 extends at approximately a 90 degree angle. Fluid port 29 terminates in an external port surface 30 that is preferably substantially planar and made of a resilient material which will form a fluid tight seal under pressure. An air line 36 for supplying pressurized air to operate the braking system of semitrailer 14 is coupled with first fluid line connector 22 and communicates with port 29.

Figure 5:
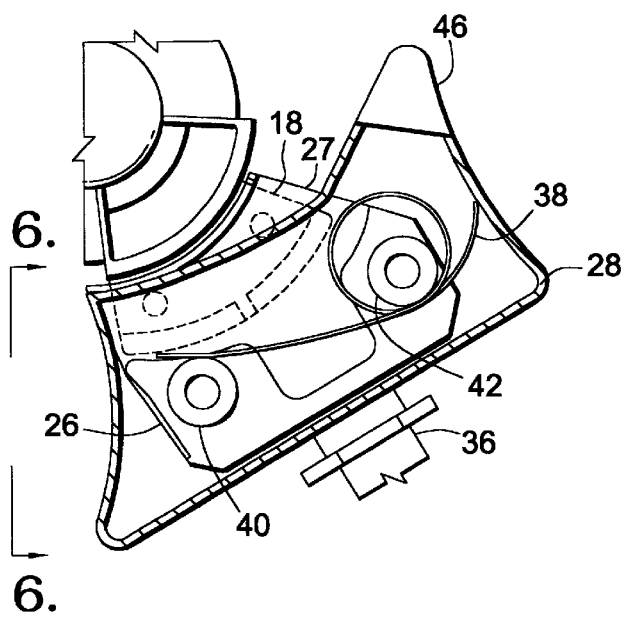
FIG. 5 is a partial side elevation view taken within circle 5 of FIG. 4 showing further detail of the latching assembly of the present invention.
Figure 6:
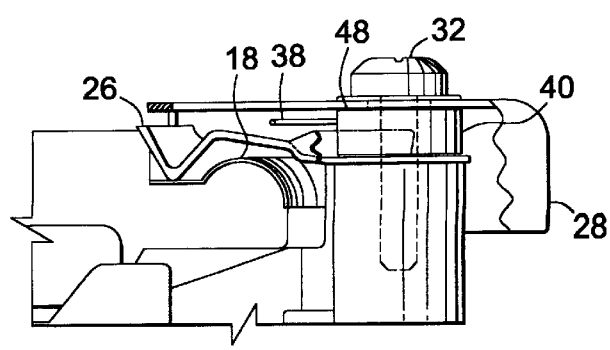
FIG. 6 is a partial side elevation view looking in the direction of line 6—6 in FIG. 5 with a portion of the latch member broken away to show particular details of construction.

As shown in FIG. 2, a latch member 28 is mounted on first fluid line connector 22 above first retainer 26. Bolts 31 and 32 pass through apertures in latch member 28 to moveably secure it to first fluid line connector 22. As shown in FIGS. 5 and 6, latch member 28 is preferably mounted on spacers 40 and 42 that are interposed between first retainer 26 and latch member 28. spacer 40 contains an aperture through its center through which passes bolt 32, and spacer 42 likewise contains an aperture in its center through which passes bolt 31. As will be understood by those skilled in the art, spacers 40 and 42 may be supplied with shoulders, such as shoulder 48 on spacer 40 shown in FIG. 6, to better facilitate operation. The outside diameter of spacer 40 above shoulder 48 is reduced to allow spacer 40 to partially enter a slot 34 until latch member 28 is proximate shoulder 48. Latch member 28 is also preferably supplied with a biasing means, such as a spring 38, to bias it to the locking position.

A second fluid line connector 16 is also shown in FIG. 2 mounted to rear wall 12. Second fluid line connector 16 includes a second flange 18, a second retainer 19, a second travel stop 20 and a fluid inlet 44. Connector 16 also has a fluid port 45 positioned to align with fluid port 29. An external surface (not visible in the drawings) identical to surface 30 provides another resilient mating surface for engaging surface 30. Second fluid line connector 22 is also preferably of the "glad hand" type, although other types of fluid line connectors could be employed with the present invention. Second flange 18 is disposed angularly about the circumference of second fluid line connector 16 and is preferably shaped to define an arc less than 90 degrees. In the preferred embodiment, second retainer 19 is a removable plate from which second travel stop 20 extends at an approximate 90 degree angle. First fluid line connector 22 is adapted to engage second fluid line connector 16, preferably by coaxial rotation, as known to those skilled in the art.

Figure 3:
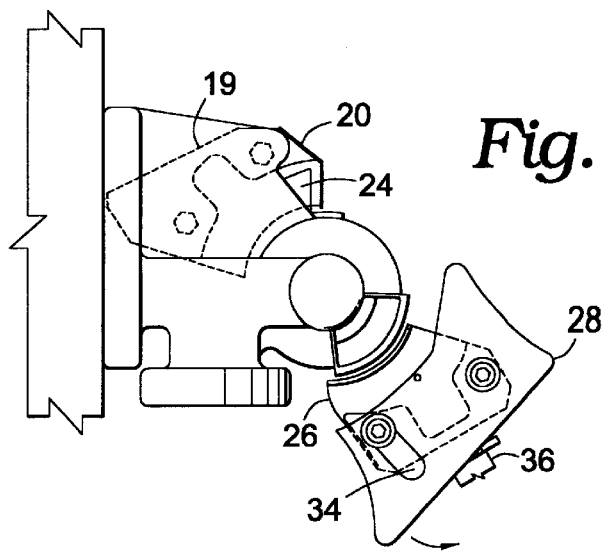
FIG. 3 is a partial side elevation view taken within circle 3 of FIG. 1 showing the latching assembly of the present invention in the release position.
Figure 4:
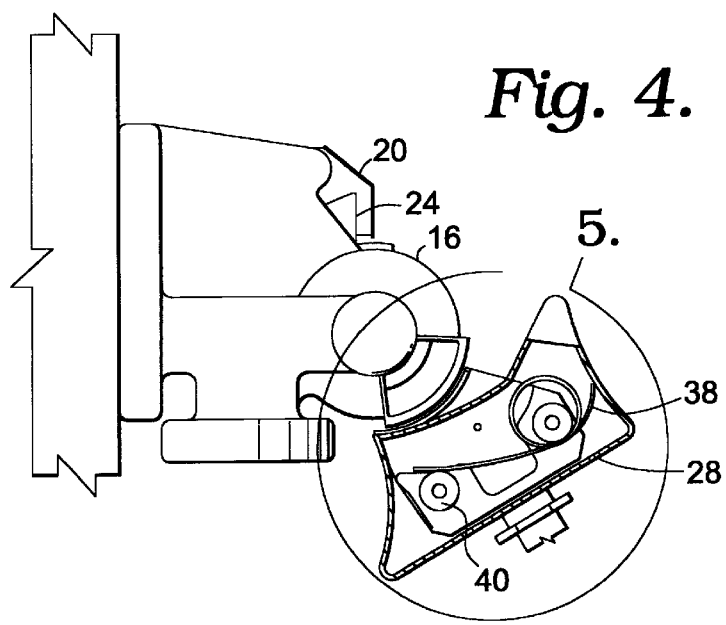
FIG. 4 is a partial side elevation view showing further detail of the latching assembly of the present invention in the locking position.

In operation, latch member 28 is moveable between a locking position, as shown in FIG. 5, and a release position, as shown in FIG. 3. In the locking position, spring 38 is slightly compressed, biasing latch member 28 to the locking position sufficiently to generally maintain that position. Latch member 28 can be moved to the release position by applying an external force, preferably upon a finger rest 46. In the presence of such a force, latch member 28 rotates about the longitudinal axis of bolt 31 in a plane substantially parallel to a plane containing external port surface 30. Depressing finger rest 46 also causes spring 38 to compress and thereby to exert an increased bias on latch member 28 to the locking position. Further movement of latch member 28 in the release direction is halted when latch member 28 contacts bolt 32, a portion of spacer 40 or other rigid member that extends through slot 34.

When latch member 28 is in the release position, first fluid line connector 22 may be coupled with second fluid line connector 16. First fluid line connector 22 and second fluid line connector 16 are placed proximate one another and are engaged by coaxial rotation. Second fluid line connector 16 is preferably disposed to enable engagement with first fluid line connector 22 by downward rotation of first fluid line connector 22 such that first fluid line connector 22 fully engages second fluid line connector 16 when the longitudinal axis of first fluid line connector is approximately 45 degrees above the horizontal. First retainer 26 complementally receives second flange 18, and second retainer 19 complementally receives first flange 24. First fluid line connector 22 is preferably rotated until second flange 18 is proximate first travel stop 27. As the two connectors are rotated, surface 30 and its complemental resilient surface on connector 16 will be placed under compression to form a fluid tight seal. After first fluid line connector 22 and second fluid line connector 16 are coupled, latch member 28 is released and thereupon returns to the locking position through the force exerted by spring 38. Latch member 28 then cooperates with first travel stop 27 to restrict rotational movement of first fluid line connector 22 relative to second fluid line connector 16. As shown in FIG. 5, when first fluid line connector 22 and second fluid line connector 16 are coupled and latch member 28 is in the locking position, further rotational movement of first fluid line connector 22 relative to second fluid line connector 16 in the direction of coupling will be stopped when second flange 18 contacts travel stop 27. Likewise, in the locking position, further rotational movement of first fluid line connector 22 relative to second fluid line connector 16 in the releasing direction will be stopped when second flange 18 contacts latch member 28. In this manner, disengagement of first fluid line connector 22 from second fluid line connector 16 is prevented when latch member 28 is in the locking position. To disengage first fluid line connector 22 from second fluid line connector 16, an external force is applied to latch member 28, preferably upon finger rest 46, to place it in the release position. While latch member 28 is held in the release position, first fluid line connector 22 is rotated to disengage from second fluid line connector 16.

As is apparent, latching assembly 25 provides an easily manufactured and efficient structure to prevent disengagement of first fluid line connector 22 from second fluid line connector 16. From the foregoing it will be seen that this invention is one well-adapted to obtain the ends and objects set forth herein together with other advantages which are obvious and which are inherent to the structure. It will be understood that certain features and subcombinations are of utility and may be employed without reference to other features and subcombinations. This is contemplated by and within the scope of the claims. Since many possible embodiments may be made of the invention without departing from the scope thereof, it is to be understood that all matters set forth in the accompanying drawings are to be interpreted as illustrative and not in any limiting sense.

Having thus described the invention, I claim:

1. A latching assembly for a first fluid line connector adapted to be mounted on a first highway traveling vehicle and coupled with a second fluid line connector mounted on a second highway traveling vehicle and having a flange and a retainer, said assembly comprising:

a first fluid line connector adapted to engage the second fluid line connector;

a fluid port disposed in said first fluid line connector terminating in an external port surface;

a first flange rigidly coupled with said first fluid line connector and adapted to be received by the second fluid line connector retainer;

a first retainer rigidly coupled with said first fluid line connector and adapted to received the second fluid line connector flange;

a travel stop at one end of said first retainer;

a first rigid member coupled with said first fluid line connector;

a latch member coupled with said first rigid member and pivotable in a plane substantially parallel to a plane containing said external port surface, between a locking position wherein said latch member cooperates with said travel stop to restrict rotational movement of said first fluid line connector relative to the second fluid line connector and thereby to prevent disengagement of said first fluid line connector from the second fluid line connector, and a release position wherein said latch member is disposed to allow disengagement of said first fluid line connector from the second fluid line connector, spring proximate said latch member disposed to bias said latch member to the locking position; and a finger rest coupled with said latch member for operable engagement by a user, whereby horizontal forces tending to disconnect said first fluid line connector and the second fluid line connector are resisted.

2. The latching assembly of claim 1, wherein said latch member includes a planar surface having a slot that receives a second rigid member to thereby limit movement of said latch member.

3. A latching assembly for a first fluid line connector mounted on a first highway traveling vehicle and having a first flange, an external port surface, a first rigid member, a second rigid member and a first retainer with a travel stop and adapted to be coupled with a second fluid line connector mounted on a second highway traveling vehicle and having a second flange and a second retainer, said assembly comprising:

a latch member adapted to be coupled with the first rigid member so that said latch member is pivotable in a plane substantially parallel to a plane containing the external port surface, between a locking position wherein said latch member cooperates with the travel stop to restrict rotational movement of the first fluid line connector relative to the second fluid line connector and thereby to prevent disengagement of the connectors, and a release position wherein said latch member is disposed to allow disengagement of the connectors and wherein said latch member includes a planar surface having a slot adapted to receive the second rigid member to thereby limit movement of said latch member;

a finger rest coupled with said latch member for operable engagement by a user; and a spring proximate said latch member adapted to bias said latch member to the locking position, whereby horizontal forces tending to disconnect the first fluid line connector and the second fluid line connector are resisted.

* * * * *